A. ELMER.
Mole-Plow.
No. 25,105. Patented Aug 16, 1859.
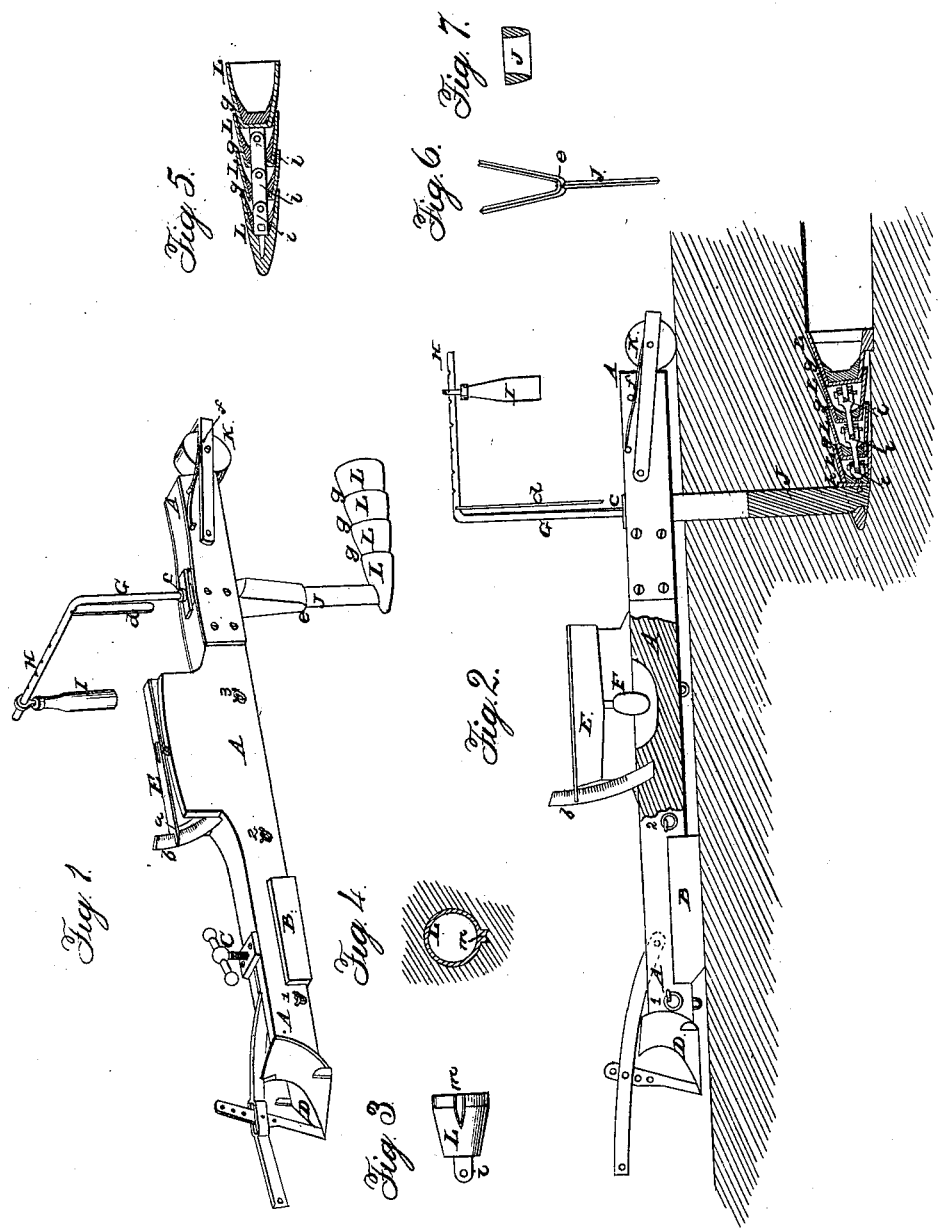

UNITED STATES PATENT OFFICE.

ASAHEL ELMER, OF SHABBONA GROVE, ILLINOIS, ASSIGNOR TO NATHAN ELMER AND REUBEN M. PRICHARD, OF SAME PLACE.

IMPROVEMENT IN MOLE-PLOWS.

Specification forming part of Letters Patent No. 25,105, dated August 16, 1859.

*To all whom it may concern:*

Be it known that I, ASAHEL ELMER, of Shabbona Grove, in the county of De Kalb and State of Illinois, have invented certain new and useful Improvements in Plows for Making Underground Ditches, or "Mole-Plows," as they are termed; and I do hereby declare the following to be a full, clear, and exact description of the same, reference being had to the accompanying drawings, making a part of this specification, in which—

Figure 1 represents a perspective view of the plow. Fig. 2 represents a longitudinal vertical section through the same in part, and in part in elevation. Figs. 3, 4, 5, 6, and 7 represent details of the plow, which will be referred to more especially hereinafter.

Similar letters of reference, where they occur in the separate figures, denote like parts of the plow in all cases.

In the practical use of these mole-plows several difficulties arise which have not heretofore been overcome. Among these difficulties I mention those of not preserving the proper and true grade, which results in the filling up of the ditch; the careening of the plow, and from its construction the almost impossibility of righting it up again; the closing of the colter-gash, so as to make the ditch in reality what it purports to be—viz., an underground drain; the ability to turn the plow out of the direct line between it and the point at which the cable or chain is fastened by which it is drawn. Upon all these points the mole-plows heretofore constructed have been deficient to a greater or less degree; and the object and aim of my invention is to overcome or provide against these contingencies by such a construction of or appliances to the plow as I shall hereinafter more particularly specify and point out.

To enable others skilled in the art to make and use my invention, I will proceed to describe the same with reference to the drawings.

A represents the beam of the plow, which has upon its forward under side an adjustable block, B, for giving the point of the beam such an elevation as the character of the ground or of the ditch may require, said block serving as a sled or drag for holding the beam from the ground. The beam A can be raised or lowered at pleasure upon this block B by a hand-screw, C.

In order that the block, sled, or drag B may not have to surmount all the knolls or small elevations upon the ground in the line of the ditch to be cut or formed, there is a scoring-plow, D, connected to the point of the beam, which cuts through and moves away the earth from these ridges or knolls, leveling them down so that the drag or block B, and consequently the whole plow, is not influenced by them, and moves along regularly in the plane or line of grade for which it is set.

On the plow-beam is pivoted a bubble, E, which has a counterpoise, F, appended to it, the object of which is to keep the bubble constantly horizontal. On this bubble is an indicator, $a$, that moves past or in close proximity to a graduated scale, $b$, properly marked, so that the operator can at all times see the exact inclination that the beam has by noting the difference on the scale, as indicated by the horizontal arm $a$.

The keeping of the plow-beam in the proper and uniform grade or slope that is to be given to the ditch is one of the most important things to be attained, for unless the ditch is kept at something like a uniform grade there is no certainty of its remaining open. On the contrary, experience proves that they will close up by the deposit in all the depressions below a regular grade.

The careening of the plow is a difficulty to be encountered in operating these ditching-machines, and owing to the length of the colter, which acts as a lever in the ground, it is next to impossible to bring it into a perpendicular position again, at least without digging it out. To provide against this careening is an important feature in my machine, and I do it in the following manner: G is an upright, supported in a socket or step, $c$, on top of the beam, so that it may be turned around in said socket or step. From the top of this upright G extends a horizontal arm, H, on which is hung a shifting weight, I, and near to the upright a plummet or pendulum, $d$, which instantly indicates the slightest leaning or careening of the plow. As soon as the operator discovers this inclination to careen on one side—say, for instance, to the left side—he immediately swings around the crane G H to the right side, as shown in Fig. 1, and the weight I thereon causes the whole to act as a lever to draw back the plow into its proper working position, which it will do gradually as the plow advances through the soil. When the plow is brought back again then the crane may be swung around, as in Fig. 2, into a line corresponding with the long axis of the beam, in which position it is inactive until again needed, the plummet always indicating when and on which side its use is required.

The next feature in my invention is the properly closing of the colter-gash. This is also important, for unless it be properly done it allows the water and soil to descend through it and fill up the ditch. Sometimes this gash allows the water from the ditch to escape through it, which is equally as bad, because it tends to make the sides fall in, which closes the ditch. I close the colter-gash, and do it effectively, as follows: The colter J is forked or branched at its upper end, so as to make two cutting-edges, as seen more particularly in Figs. 6 and 7, which meet at a point, or nearly so, as at $e$. Below this point $e$ the colter is of the usual form. The two branches of the colter cut a wedge-shaped slice clear from the adjacent soil, and this wedge-shaped slice stands directly over the colter-gash below it, and when the roller K comes upon it, (which is connected to the rear of the plow, but not so far back as to force in the walls of the finished ditch,) it crowds or drives down this wedge-shaped slice of earth, and thus completely and effectually closes the colter-gash. A roller alone has heretofore been used for this purpose, but it will not accomplish the object; but causing a roller to drive down a wedge-shaped piece of earth into it closes the gash against the ingress or egress of the water, and effectually, too.

The roller K may have within itself the necessary weight to drive down this wedge or packing, or springs $f$ may be used to aid it in so doing; or the roller may have a hammering motion given to it, if found desirable, to drive down this wedge; but, as before stated, this crowding or driving down of the wedge must be done at a point under which the mole is still in the ditch, else the tendency would be to break in the surroundings of the ditch.

The mole which I use is peculiar both in its construction and operation, and though a mole or former has been made up of a series of sections or formers linked together, yet none of them possess the properties of mine. A mole must be made so that it can move horizontally in the ground independently of the motion or guidance of the plow, because it often meets obstructions to which it must give way to pass them, and also to facilitate making angles; but it should not have any vertical movement of any extent, because such a movement destroys the grade of the ditch and leaves depressions that immediately fill up with deposit carried along by the water, a six-inch depression, which is the ordinary caliber of the drain, being certain to close the ditch, as it will form an eddy into which the soil or alluvia will stop and deposit.

My mole is formed of a series of conical-shaped sections, L, which may be, for convenience and lightness, hollow. These sections increase in area as they extend back from the colter J, to which they are connected, until the rear end of the last of the series completes the drain. The increase in diameter is uniform in the sections; but there is a slight shoulder, $g$, at each of the joinings, so that each section shall enlarge the caliber of the drain, and smooth, finish, and trowel, as it were, the ditch, and these many trowelings make the walls of the ditch not only smooth, but exceedingly compact and firm. The first cone of the series is fastened firmly to the foot of the colter by a key, $h$, which also passes through and firmly holds a clevis, $i$, whose shank may be thin enough to spring in a lateral direction, if so preferred; and to this clevis is linked, by a horizontal joint, $k$, the next succeeding clevis or link throughout the series, the nose or point $l$ of each of the sections L entering into the hollow base of the one in advance of it, so that while the sections may work, spring, yield, or move horizontally one upon the other they are comparatively rigid in a vertical line, thus keeping the drain on a uniform grade, but free to pass around any intervening obstacle.

The rear section of the cone or former has upon its under part a shoe or scorer, $m$, (more distinctly seen in Figs. 3 and 4,) for forming and opening a water-groove in the bottom of the ditch without packing the earth around it, which admits the water, or taps, as it were, the drain for the admission of the water into it, the sides of the drain being too much packed to admit the water. In Fig. 5 a horizontal section through the mole or former is shown.

In the use of these machines it is often found desirable to cause them to move out of a direct line with the point of attachment to the capstan or other power by which they are drawn through the earth; but no effectual way has been devised to accomplish that end until carried into practice by me. So long as the rope or chain is attached to the point of the beam of course the beam must move in a direct or straight line toward the capstan or other power. I have discovered, however, that the plow, without moving the capstan, can be made to travel out of that line, and either to the right or left, as may be desired, which is highly important when the direction of the ditch is to be changed, either to suit the ground or to avoid an obstruction. I place along the beam, on both of its sides, a series of hitching-rings, 1 2 3, &c., into either of which the chain or rope may be fastened, and then, by placing a brace or stay between the rope or chain and the point of the beam, said point may be made, just in accordance with the line of draft, to move out of its direct line, and make a considerable deviation therefrom in the direction desired, and thus the ditch may curve from one of its lines to another without, as heretofore, making an angle and shifting the capstan so often, which is a heavy, if not the heaviest, part of the work. Rings or eyes may also be attached to the under part of the beam, for drawing out the moles or former to the surface.

Having thus fully described the nature and object of my invention, what I claim therein as new, and desire to secure by Letters Patent, is—

1. In combination with the adjustable block B on the plow-beam, the scoring or leveling plow D in advance of it, substantially as and for the purpose described.

2. In combination with the plow beam and colter, the swinging weighted crane or lever for preventing the careening of the plow, or for recovering its proper position after it has careened, substantially as described.

3. The combination of a forked colter for cutting a wedge-shaped or tapering slice over the colter-gash, with a pressing or driving device for forcing down said slice, and thus packing the colter-gash, as described.

4. A mole or former made of a series of conical-shaped sections which increase in size as they recede from the colter, and which are so linked together as that they may move in a horizontal frame, but be comparatively rigid in a vertical plane, substantially as herein described and represented, and for the purpose set forth.

5. In combination with the mole L, the scorer or shoe $m$ on its rear section or end, said scorer forming a groove or channel in the bottom of the finished drain for admitting the water into it, the sides of the drain being so closely packed as to prevent the water from entering there, said scorer being constructed and arranged as herein represented.

ASAHEL ELMER.

Witnesses:
E. COHEN,
THOS. H. UPPERMAN.